United States Patent
Wang et al.

(10) Patent No.: US 7,135,798 B2
(45) Date of Patent: Nov. 14, 2006

(54) MAGNETIC SUSPENSION BEARING

(75) Inventors: Chien-Chang Wang, Hsinchu (TW); Wei-Cheng Chen, Hsinchu (TW); Chau-Shin Jang, Hsinchu (TW); Chun-Min Chen, Hsinchu (TW)

(73) Assignee: Industrial Technology Reserach Institute, Hsinchu (TW)

( * ) Notice: Subject to any disclaimer, the term of this patent is extended or adjusted under 35 U.S.C. 154(b) by 0 days.

(21) Appl. No.: 11/059,522

(22) Filed: Feb. 17, 2005

(65) Prior Publication Data

US 2005/0140229 A1     Jun. 30, 2005

Related U.S. Application Data

(63) Continuation-in-part of application No. 10/626,662, filed on Jul. 25, 2003.

(51) Int. Cl.
    *H02K 7/09*     (2006.01)
(52) U.S. Cl. ........................................ 310/90.5; 310/90
(58) Field of Classification Search ................ 310/90, 310/90.5
    See application file for complete search history.

(56) References Cited

U.S. PATENT DOCUMENTS

| 3,384,427 | A |   | 5/1968  | McHugh et al. |
| 4,082,376 | A |   | 4/1978  | Wehde et al. |
| 4,340,260 | A |   | 7/1982  | Forster et al. |
| 5,506,459 | A | * | 4/1996  | Ritts ........................ 310/90.5 |
| 5,587,617 | A | * | 12/1996 | Dunfield et al. ........... 310/90.5 |
| 5,783,886 | A |   | 7/1998  | Hong |
| 5,834,870 | A |   | 11/1998 | Tokushima et al. |
| 5,982,064 | A | * | 11/1999 | Umeda et al. ................. 310/90 |
| 6,218,751 | B1 |  | 4/2001  | Bohlin |
| 6,420,810 | B1 |  | 7/2002  | Jeong |
| 6,617,732 | B1 |  | 9/2003  | Lin et al. |
| 6,664,687 | B1 |  | 12/2003 | Ichiyama |
| 6,703,736 | B1 | * | 3/2004  | Wang et al. ................ 310/90.5 |

* cited by examiner

*Primary Examiner*—Tran Nguyen
*Assistant Examiner*—Nguyen N. Hanh
(74) *Attorney, Agent, or Firm*—Akin Gump Strauss Hauer & Feld, LLP

(57) ABSTRACT

A magnetic suspension bearing located between the spindle and stator of a rotational device includes stator magnetic units mounted on the top side and bottom side of the stator and spindle magnetic units, which are mounted on two ends of the spindle. One end of the spindle has a loading section to support the spindle. The stator magnetic units and the spindle magnetic units generate a repulsive magnetic force to separate the spindle and stator from one another at a selected distance to avoid vibration and noise caused by obliquity and to increase the service life of products.

17 Claims, 9 Drawing Sheets

MAGNETIC SUSPENSION BEARING

This application is a Continuation-In-Part of copending Application No. 10/626,662 filed on Jul. 25, 2003, the entire contents of which are hereby incorporated by reference and for which priority is claimed under 35 U.S.C. § 120.

FIELD OF THE INVENTION

The invention relates to a bearing adopted for use on electronic products and particularly to a magnetic suspension bearing that provides a repulsive magnetic force between a stator and a spindle to avoid friction and wearing.

BACKGROUND OF THE INVENTION

In recent years rapid innovations and developments have occurred with electronic products. With the continuous advance of semiconductor manufacturing technologies, electronic products have become more powerful and their prices have dropped. They are now widely accepted by the general public. Nowadays there are a wide variety of electronic products on the market. For the driving motor bearings used in information storage devices, there are oil impregnated bearings, ball bearings, and the like. The oil impregnated bearing has a lower price and thus cost advantage. However, its service life is shorter. The ball bearing has a longer service life, but it is more expensive and has a lower capability to withstand impact. These two types of bearings have their spindles in contact with the inner walls of the bearings. As a result, the motor tends to generate vibration and noise, and its service life becomes lower. On the other hand, dynamic bearings also are frequently used in the industry. The dynamic bearing is more precise and has a longer service life. It has become the mainstream in the market. However, it has starting friction and wearing problem that has yet to be overcome. Moreover, its production cost is higher, and production yield still does not reach the level desired. These issues remain to be resolved.

It is well known that magnets of the same polarity repel each other. This property can be used to reduce wear when the spindle rotates. This has gradually become an important research and development direction in the industry. Some techniques are known in the art. For instance, FIG. 5 discloses the conventional magnetic suspension bearing. It has magnetic portion 700 installed on the stator 800, and a spindle 500 has a permeance ring 600. However, this conventional magnetic suspension bearing has only one magnetic portion 700 and the permeance ring 600 to generates suspension, so its C.M. 900 (center of mass) is unstable and vibration and obliquity is easily occurred. FIG. 6 shows another conventional magnetic suspension bearing. It has magnetic portion 210 (made of permanent magnet) installed on the stator 200. An upper-inner permeance ring 310 (made of magnetic material), lower-inner permeance ring 320 (made of magnetic material) located respectively on the top side and the bottom side of the spindle 300. A ball bearing 400 (or a self-lubricated sleeve) is located between two ends of the spindle. However, the conventional magnetic suspension bearing has some drawback. First, for avoiding the magnetic portion and stator generates magnetic linkage, the contacting area of upper-inner permeance ring and lower-inner permeance ring must be restricted. Thus the restriction of operating environment is very critical. Second, A ball bearing and a self-lubricated sleeve are located between two ends of the spindle, which further complicates the structure. U.S. Pat. No. 5,783,886 discloses a technique in which a spindle motor has a magnetic bearing. It has magnetic elements installed respectively on the spindle and the stator. The repulsive magnetic force enables the spindle to generate radial magnetic suspension against the stator to thereby avoid generating friction contact and wear. While it is easy to assemble and the axial magnetization is easy for mass production, the assembly positions of the spindle and the stator must be controlled accurately. A slight vibration from an external force will create obliquity. In other words, it adopts a magnetic suspension bearing design concept that is operable only in very precise conditions. U.S. Pat. No. 4,340,260 discloses another technique that has oblique magnetic elements installed on the stator and the spindle. It uses the property of repulsive magnetic force of the same magnetic polarity to enable the spindle and the rotator to generate suspension. It has a greater resistance against external impact and can prevent skewing, and magnetization is easier. U.S. Pat. No. 6,664,687 discloses a technique that applying a magnetic flux to the shaft. It has a shaft with a diminishing conical taper, and a sleeve arranged opposite the shaft has a conical concavity. The clearance between the shaft and the sleeve is filled with magnetic oil. The shaft 11 has the permanent magnet inside, and the sleeve is made of a magnetic material. When the shaft is tiled, the shaft with conical taper and the magnetic attraction between the shaft and the sleeve can help maintain the stable attitude of rotary section. However, above techniques are difficult to assemble, and the cost is higher.

In short, there are still many problems in the conventional techniques that need to be overcome.

Moreover, U.S. Pat. No. 5,506,459 discloses a technique in which a magnetically spining apparatus is balanced by circumscribing magnets is disclosed. It has a shaft with magnets, and a frame with support magnets. Particularly, the magnetic polarity dividing line of the magnets of the shaft are slightly higher than the magnetic polarity dividing line of the support magnets of the shaft for levitating the shaft to minimize friction at the pivot point. However, decreasing the friction of the shaft results the rotational devies (i.e. electric fan, hard disk, compact disk player, and so on.) rotate unstable.

SUMMARY OF THE INVENTION

In view of the aforesaid disadvantages, the primary object of the invention is to provide a magnetic suspension bearing that adds an axial pretressing force to the spindle for raising the friction properly and has a simple structure and may operate smoothly.

The magnetic suspension bearing of the invention is adopted for use on rotational devices such as precision motor bearings, precision air fan bearings and the like, which are widely used in various types of electronic products, especially on data storage devices. The rotational device generally consists of a stator, a spindle and a base dock for holding the stator. The spindle is to couple with the magnetic suspension bearing of the invention, and is located in the stator in a rotational manner.

The magnetic suspension bearing of the invention includes two magnetic ring sets and a loading section. Each magnetic ring set has a stator magnetic unit located respectively on the top side and the bottom side of the stator. There is a spindle magnetic unit corresponding to the stator magnetic unit that is installed respectively on two ends of the spindle. The loading section is located on one end of the spindle and is interposed between the spindle and the base dock to support the spindle. The spindle magnetic unit and the stator magnetic unit generate repulsive magnetic force between them to separate the spindle and the stator from one another at a selected distance in normal conditions. Thereby friction loss caused by obliquity between the spindle and the stator can be effectively reduced. Futhermore, the magnetic center line of the spindle magnetic units is lower than the magnetic center line of the stator magnetic units which supplied the axial prestressing force for the spindle. The axial prestressing force raises the friction properly between the spindle and the loading section. It made the spindle can revolve steadier and solved the swaying problem of the rotational devices with disequilibrium weight of loading.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
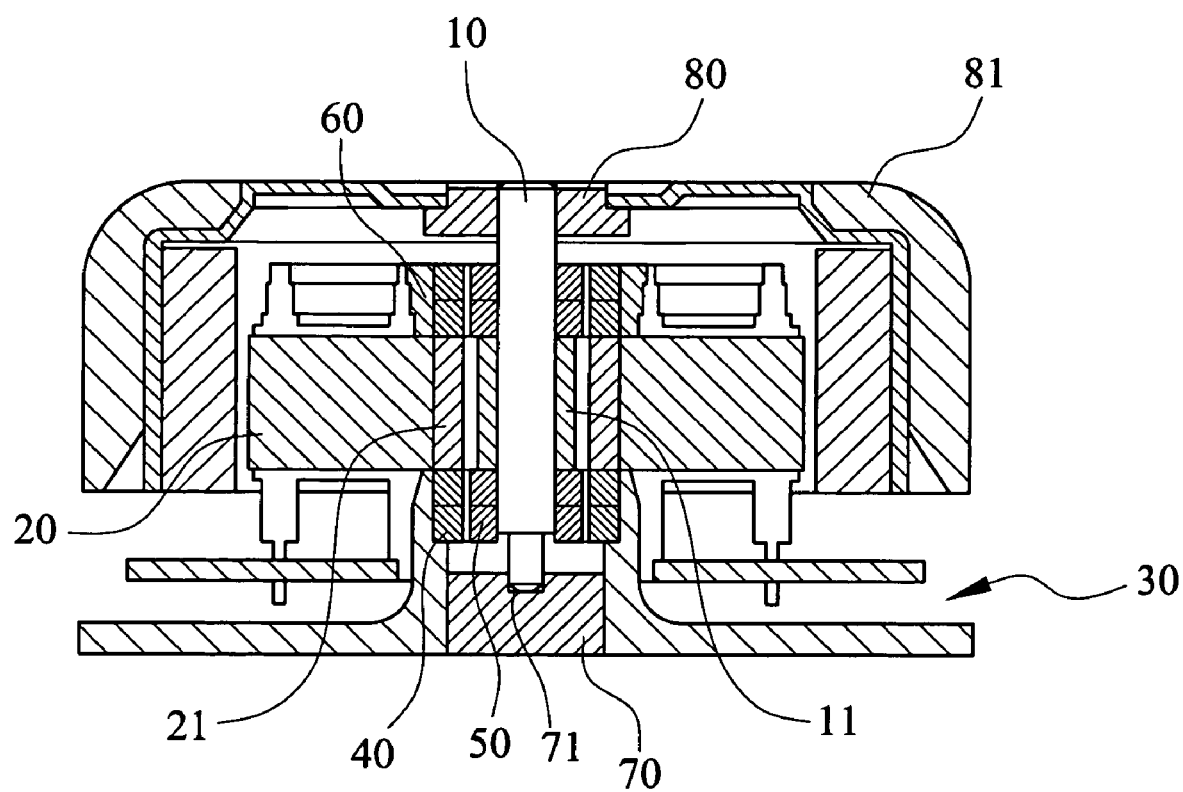
FIG. 1A is a sectional view of a first embodiment of the magnetic suspension bearing of the invention.

The magnetic suspension bearing of the invention aims at reducing the friction loss between the spindle and the stator and to avoid generating vibration and noise to make operation smoother and increase the service life of the product. Refer to FIG. 1 for a first embodiment of the invention. The rotational device generally includes a spindle 10, a stator 20 and a base dock 30. The spindle 10 is located in the stator 20 and may rotate therein. The base dock 30 holds the stator 20. The spindle 10 has a bottom end mounting on a loading section 70. The loading section 70 is interposed between the base dock 30 and the spindle 10 to support the spindle 10. The spindle 10 has a top end coupling with an iron yoke 80 and an iron yoke sleeve 81 to protect the inner elements of the stator 20.

The magnetic suspension bearing of the invention further has two sets of magnetic rings located at two ends of the spindle 10. The magnetic rings include two stator magnetic units 40 abutting the top side and bottom side of the stator 20, and are coupled with a separator 60 for anchoring the stator magnetic units 40 and preventing external magnetic force of the magnetic units such as the iron core of the stator 20 from affecting the stator magnetic units 40. Two spindle magnetic units 50 are provided at two ends of the spindle 10 corresponding to the stator magnetic units 40. The stator magnetic units 40 and the spindle magnetic units 50 generate repulsive magnetic force between them to enable the spindle 10 and the stator 20 to maintain a radial suspension state and space them from one another at a selected distance in normal conditions. The stator magnetic units 40 at two ends of the stator 20 further include a stator separation ring to separate and control the distance between two neighboring stator magnetic units 40 to avoid magnetic interference. Similarly, the spindle magnetic units 50 at two ends of the spindle 10 are interposed by a spindle separation ring 11 to separate and control the distance between two neighboring spindle magnetic units 50 to avoid magnetic interference.

When the spindle 10 rotates relative to the stator 20, the spindle magnetic units 50 and the stator magnetic units 40 generate repulsive magnetic force between them. The spindle 10 has one end inserted into a cavity 71 to be in contact with the loading section 70. Thus the spindle 10 and the stator 20 are in a radial suspension state and are spaced from each other at a selected distance to avoid generating vibration and noise caused by obliquity. Thereby friction loss between the spindle 10 and the stator 20 may be reduced, and service life of the product increases. It is to be noted that the vertical difference between the stator magnetic units 40 and the spindle magnetic units 50 is controlled through the loading section 70, spindle separation ring 11 and stator separation ring 21. This distance is preferably less than 1 mm. The invention is applied for the rotational devices of the electric fan, Compact Disk player or Hard Disk, etc. And the spindle 10 of the devices is used of supporting for the loading of the fan or the disk. Thus, the general loading of the rotational devices is often come into swaying because of the lack or the unbalance weight.

Figure 1B:
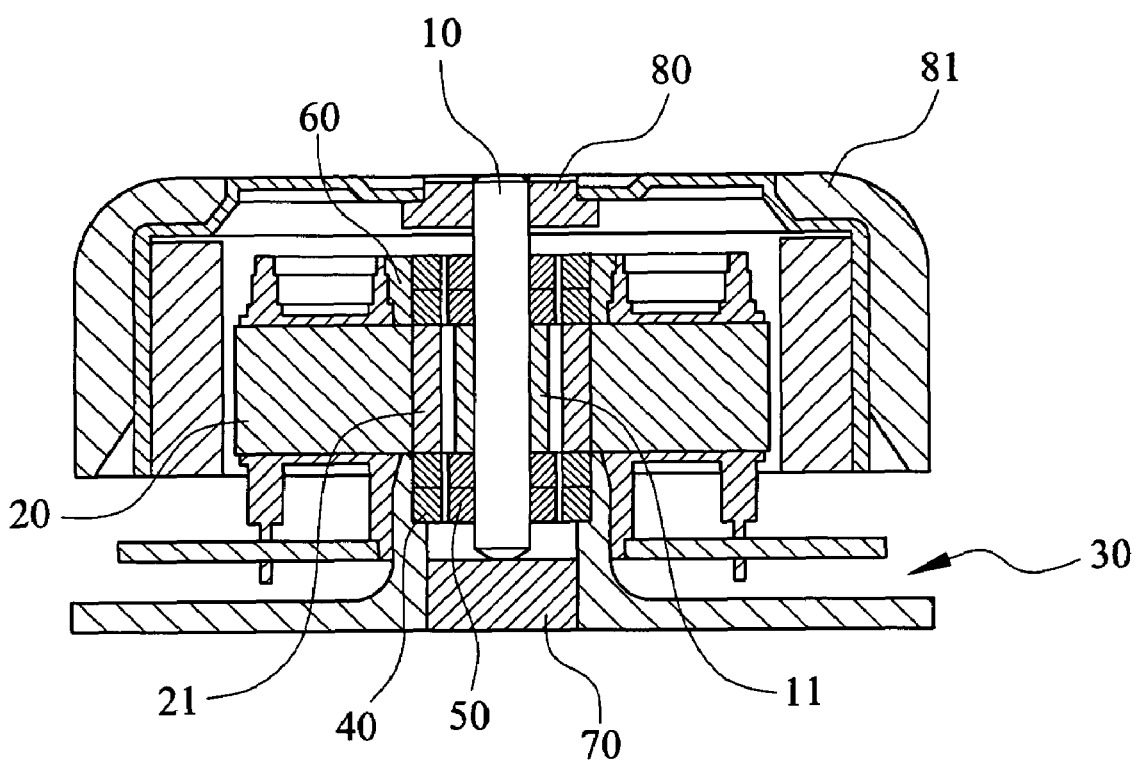
FIG. 1B is a sectional view of a second embodiment of the magnetic suspension bearing of the invention.
Figure 1C:
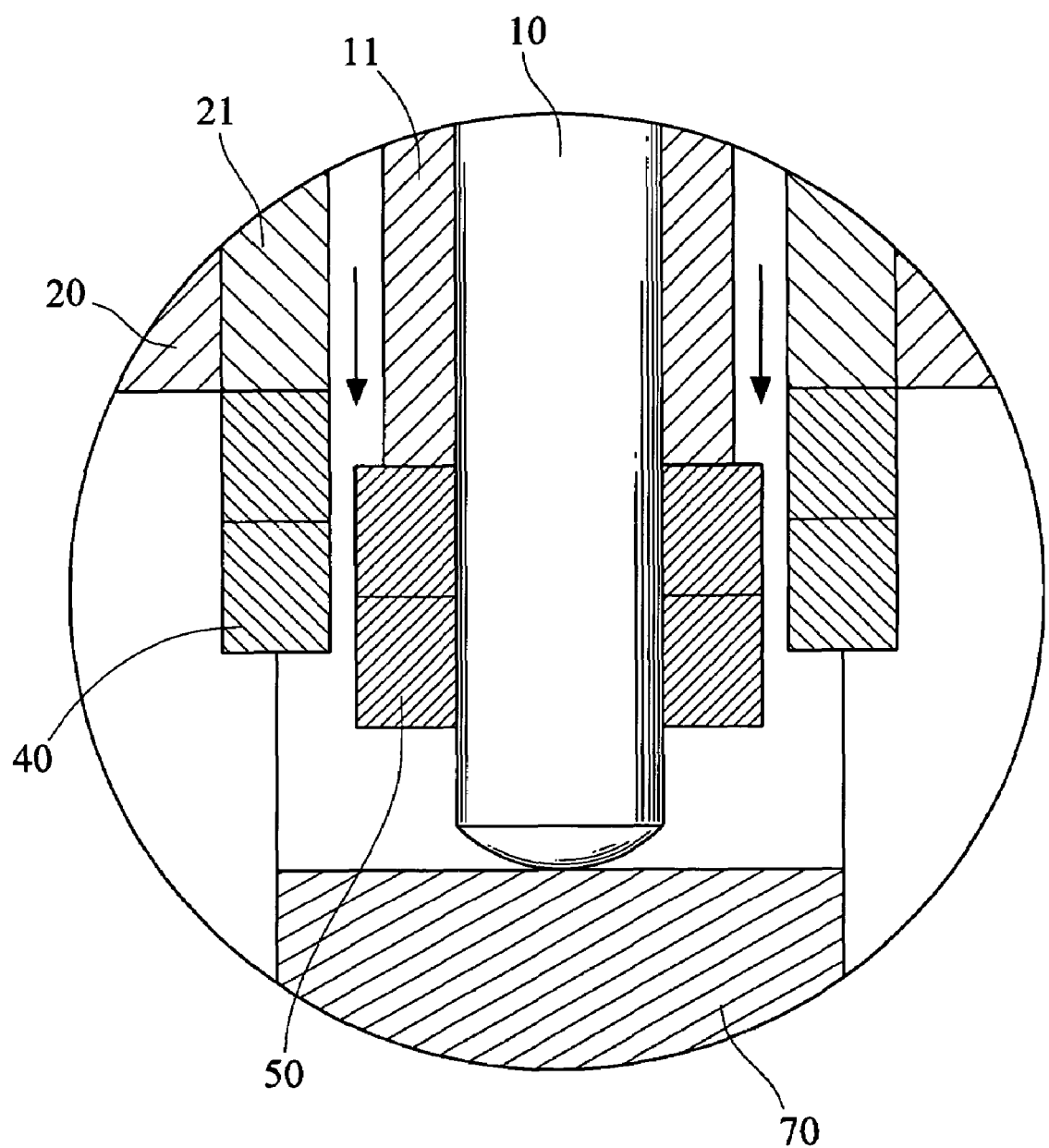
FIG. 1C is a partial view of the invention showing the magnetic center line between the spindle magnetic units and the stator magnetic units.

For this reason, FIG. 1C shows the magnetic center line of the spindle magnetic units 40 is lower than the magnetic center line of the stator magnetic units 50 which supplied the axial prestressing force for the spindle 10. The spindle 10 not only accepted the gravitation made by the loading of the fan or the disk, but accepted the axial prestressing force and it was supported by the loading section 70. Generally speaking, the position of the spindle magnetic units 40 is lower than the position of the stator magnetic units 50 and it supplied for the axial prestressing force, and the length between the stator magnetic unit and the spindle magnetic unit is less than 1 mm. The axial prestressing force raises the friction properly between the spindle 10 and the loading section 70. It made the spindle 10 can revolve steadier and solved the swaying problem of the rotational devices with disequilibrium weight of loading.

Besides, one end is the rounded angle linked between the spindle 10 and the loading section 70. When the spindle 10 came into swaying slightly, with the rounded angle, it will raise the friction appropriately between the spindle 10 and the loading section 70. It also made the revolving motion of the spindle 10 run more smoothly.

Figure 1D:
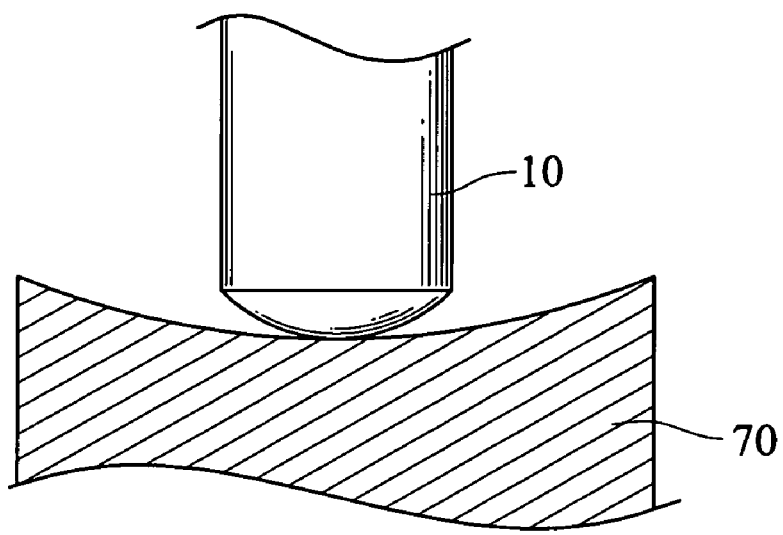
FIG. 1D is a partial view of the invention showing the configuration of the loading section.
Figure 1E:
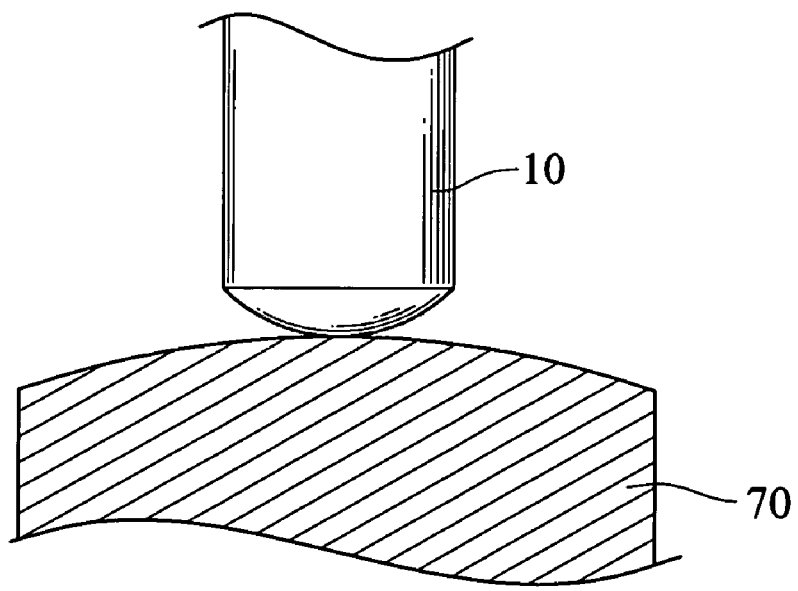
FIG. 1E is a partial view of the invention showing another configuration of the loading section.

The loading section 70 is a friction pad and is generally made from molybdenum disulfide. It mainly provides support for the spindle 10. In practice, many alterations may be made. FIG. 1B illustrates a second embodiment of the invention. Compared with the first embodiment, the main difference is that in the first embodiment the spindle 10 is inserted into the cavity 71. In the event of obliquity into the spindle 10, friction loss takes place and may result in decreasing rotation speed and increased electric current. Thus the second embodiment provides an improvement for the loading section 70. The loading section 70 has substantially a flat top surface, and supports the spindle 10 in a single point contact condition. Thus it can avoid the friction and wear that might otherwise happen to the periphery of the spindle 10 and the cavity 71. As a result, vibration and noise may be reduced and the spindle 10 can rotate steadily and smoothly. The contact surface of the loading section 70 and the spindle 10 is not necessary a flat surface. Refer to FIG. 1D and FIG. 1E, the loading section 70 may also be a concave surface or an arched convex surface as long as a single point contact is formed.

Figure 2D:
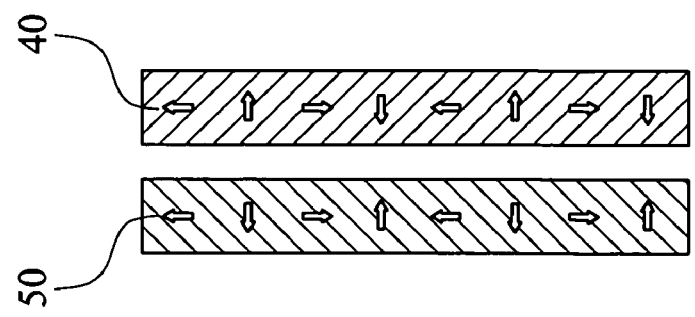
FIGS. 2A through 2D are schematic views of the invention showing the magnetization direction of the stator magnetic unit and the spindle magnetic unit.
Figure 2C:
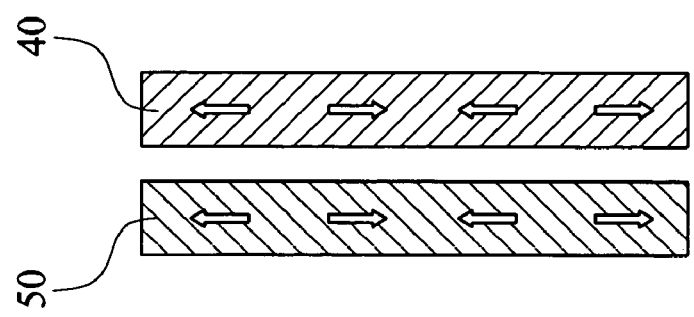
Figure 2B:
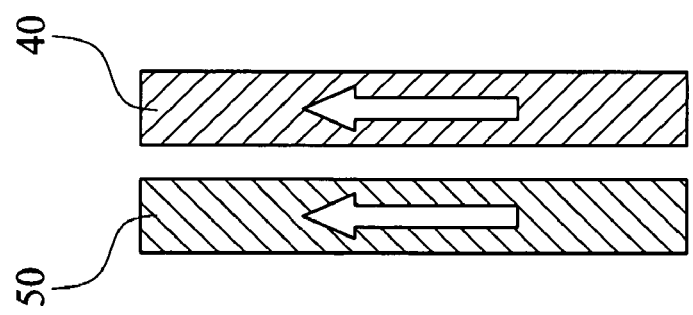
Figure 2A:
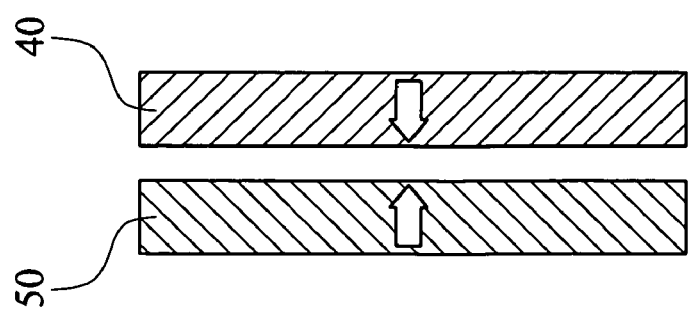

The magnetization direction of the stator magnetic units 40 and the spindle magnetic units 50 may have many variations. FIG. 2A illustrates one condition in which the stator magnetic units 40 and the spindle magnetic units 50 have opposite magnetization in the radial direction to provide repulsive forces. FIG. 2B shows another preferred approach in which the stator magnetic units 40 and the spindle magnetic units 50 have the same magnetization axially that can also provide mutually repulsive forces. FIG. 2C depicts yet another approach in which the stator magnetic units 40 and the spindle magnetic units 50 have corresponding axial magnetization formed therein to provide repulsive magnetic force. FIG. 2D illustrates still another approach in which the spindle magnetic units 50 has radial and axial magnetization formed alternately therein, i.e. the radial magnetization of the two is formed in the opposite directions, while the axial magnetization is formed in the same direction. Therefore the stator magnetic units 40 and the spindle magnetic units 50 generate mutual repulsive forces. As a result, the spindle 10 coupled with the spindle magnetic units 50 and the stator 20 coupled with the stator magnetic units 40 may generate radial suspension between them.

Figure 3:
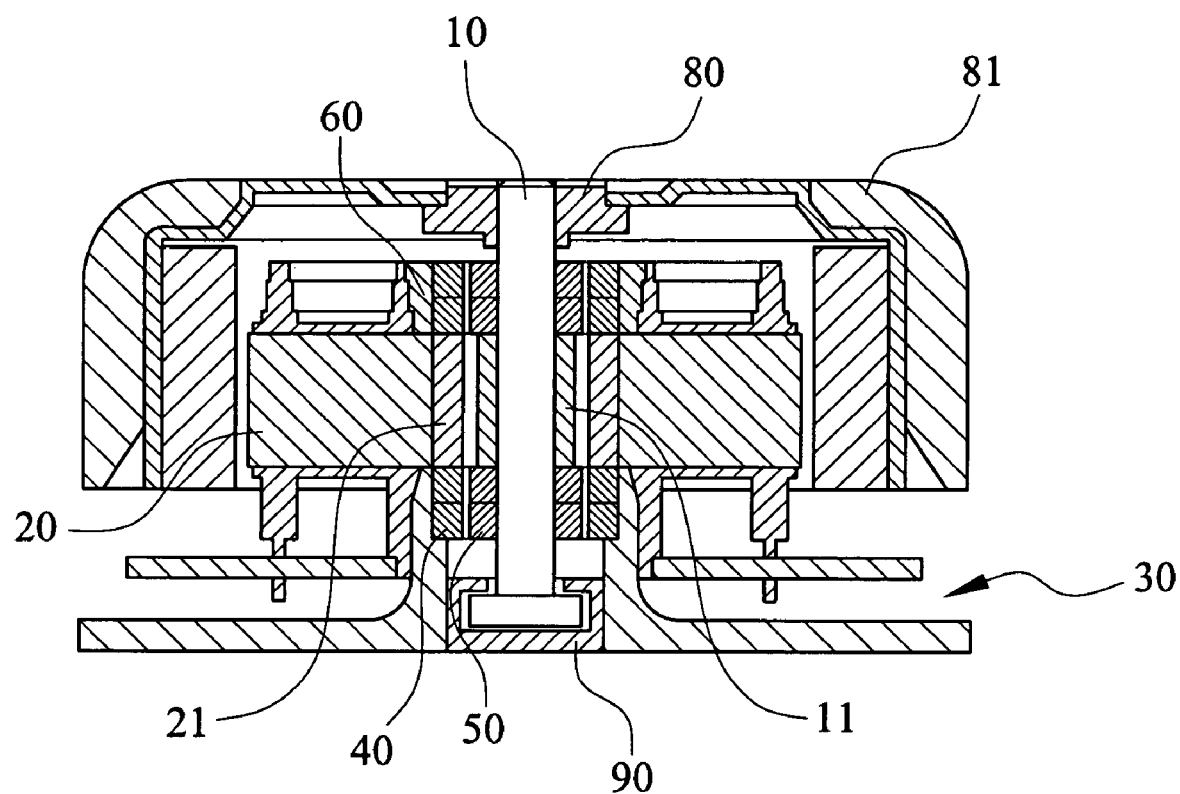
FIG. 3 is a sectional view of a third embodiment of the magnetic suspension bearing of the invention.

Refer to FIG. 3 for yet another embodiment of the invention. The bottom end of the spindle 10 is formed in a circular disk. A lubrication unit 90 is provided to contain a small amount of oily substance such as lubrication oil to provide lubrication for the spindle 10. Thus the spindle 10 can almost be completely suspended to effectively reduce friction and wear. The lubrication unit 90 may include many elements as desired. A preferred choice is to couple with a dynamic thrust bearing.

Figure 4:
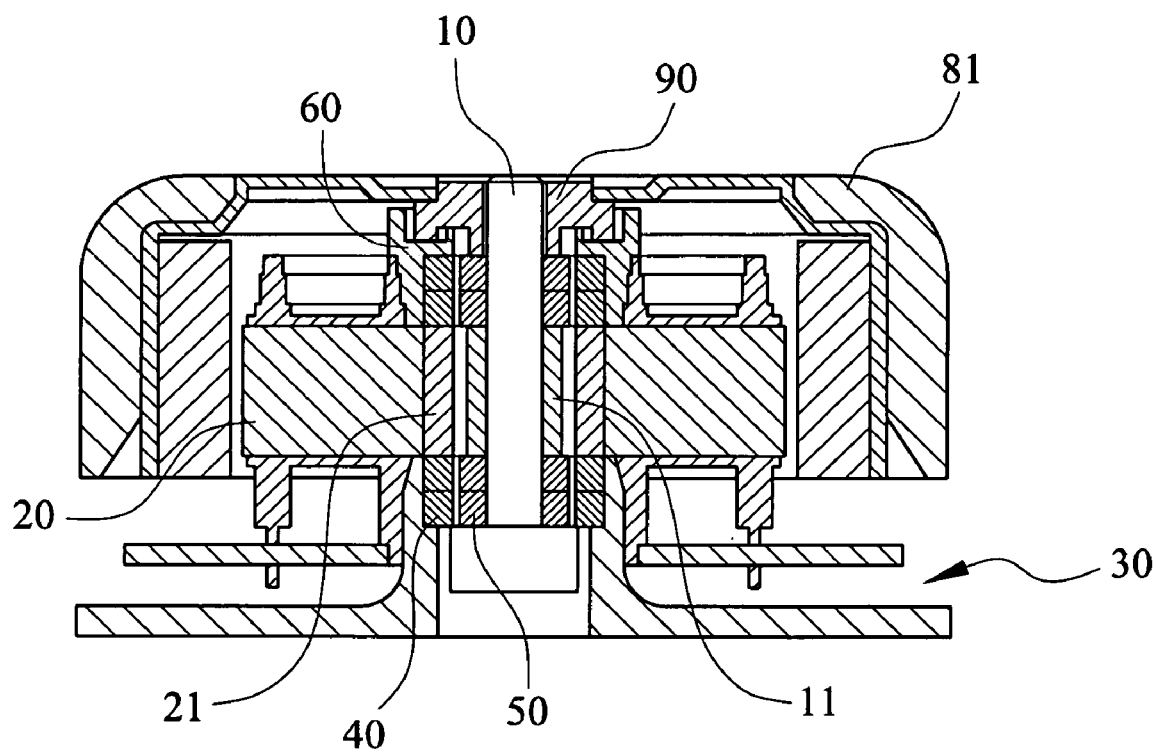
FIG. 4 is a sectional view of a fourth embodiment of the magnetic suspension bearing of the invention.
Figure 5:
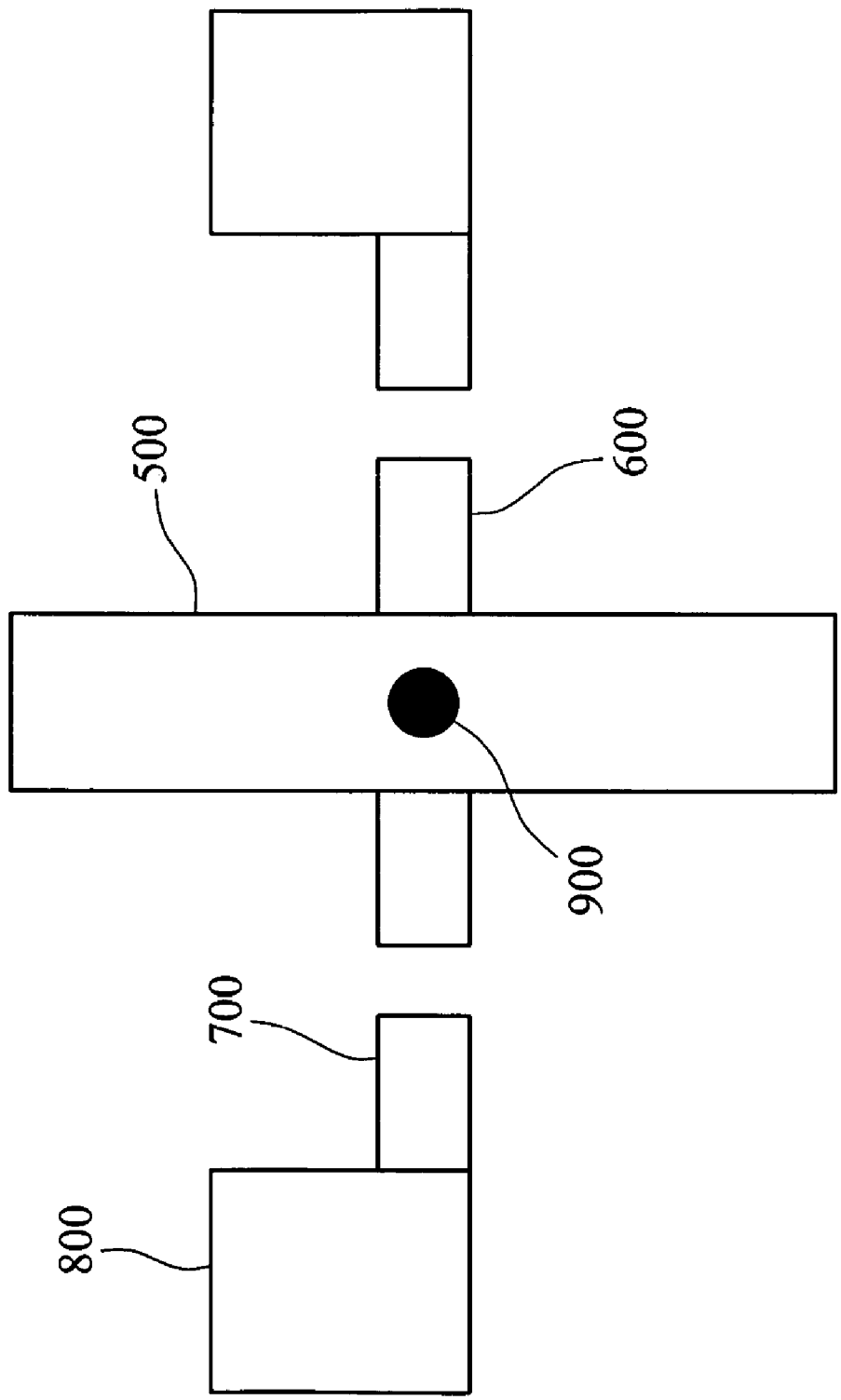
FIG. 5 is a sectional view of the conventional magnetic suspension bearing.
Figure 6:
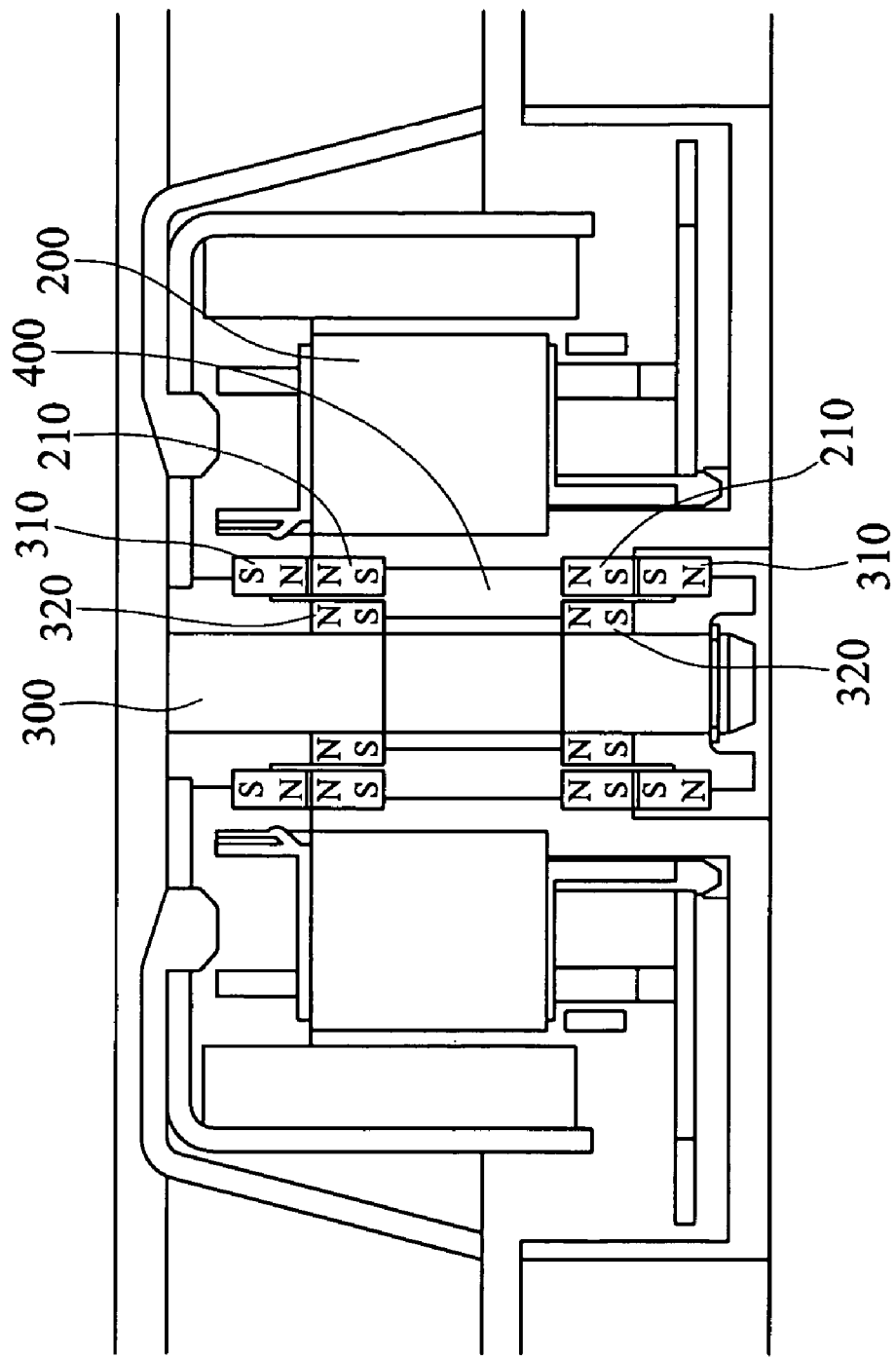
FIG. 6 is a sectional view of another conventional magnetic suspension bearing.

The loading section 70, aside from being located at the bottom end of the spindle 10, may also be located at the top end of the stator as shown in a fourth embodiment of the invention in FIG. 4. The top side of the stator 20 is coupled with a lubrication unit 90. As previously discussed, it can contain lubrication oil to provide lubrication and reduce friction and wear, and enables the spindle 10 to be almost completely suspending. There are many other embodiments may be adopted to achieve the same result. Of course, a dynamic thrust bearing may also be coupled in this embodiment.

By means of the aforesaid constructions, it is clear that the magnetic suspension bearing of the invention can provide the following advantages:
1. Radial suspension effect: the spindle magnetic units and the stator magnetic units have repulsive forces between them, and the loading section provides a single point contact for the spindle. Thus the spindle and the stator can generate a suspension effect between them. In addition, the spindle magnetic units can isolate the effect of external magnetism. The spindle can rotate smoother and effectively avoid obliquity. Moreover, the magnetic center line of the spindle magnetic units is lower than the magnetic center line of the stator magnetic units which supplied the axial prestressing force for the spindle. Therefore the axial prestressing force raises the friction properly between the spindle and the loading section. It made the spindle can revolve steadier and solved the swaying problem of the rotational devices with disequilibrium weight of loading.
2. Preventing generation of vibration and noise: compared with the conventional techniques that have to operate in a precise environment in which obliquity is prone to occur to the spindle and stator during operation, and vibration and noise are bound to be generated, the invention has excellent radial suspension and can prevent the generation of vibration and noise.
3. Increasing service life of products: in general the continuous wearing between the spindle and stator is the main reason for product damage and shorter service life. The invention can greatly improve the problems of noise and vibration, and product service life can thus be enhanced.
4. Effectively reducing cost: conventional techniques often have complex structures and are difficult to assemble, and result in increasing production cost. The invention provides a simple structure to generate radial suspension. Assembly is easy and product cost can be greatly reduced.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A magnetic suspension bearing for use on a rotational device which consists of a stator, a spindle and a base dock for holding the stator, the spindle being rotationably coupled with the stator through the magnetic suspension bearing, the magnetic suspension comprising:
    two magnetic ring sets each including a stator magnetic unit abutting a top side and a bottom side of the stator and a spindle magnetic unit coupled on two ends of the spindle corresponding to the stator magnetic unit to generate repulsive magnetic forces against the stator magnetic unit and allow the spindle to space from the stator at a selected distance in normal conditions, and the magnetic center line of the spindle magnetic unit is lower than the magnetic center line of the stator magnetic unit for generating an axial prestressing force to the spindle; and
    a loading section located at one end of the spindle to hold the spindle and the axial prestressing force, the prestressing force causing additional friction between the spindle and the loading section to stabilize the spindle.

2. The magnetic suspension bearing of claim 1, wherein the vertical length between the stator magnetic unit and the spindle magnetic is less than 1 mm.

3. The magnetic suspension bearing of claim 1, wherein the loading section is located on the bottom end of the spindle and is interposed between the spindle and the base dock.

4. The magnetic suspension bearing of claim 1, wherein the loading section is a friction pad.

5. The magnetic suspension bearing of claim 1, wherein the loading section is a lubrication unit which contains a small amount of oily substance to lubricate the spindle.

6. The magnetic suspension bearing of claim 1 further having a spindle separation ring located between the spindle magnetic units at two ends of the spindle.

7. The magnetic suspension bearing of claim 1 further having a stator separation ring located between the stator magnetic units at the top side and the bottom side of the stator.

8. The magnetic suspension bearing of claim 1, wherein the top side of the stator has a separator to couple with the stator magnetic unit.

9. The magnetic suspension bearing of claim 1, wherein the spindle magnetic unit is magnetized axially and the stator magnetic unit is magnetized axially in the same magnetized direction of the spindle magnetic unit.

10. The magnetic suspension bearing of claim 1, wherein the spindle magnetic unit is magnetized radially, and the stator magnetic unit is magnetized radially in an opposite magnetized direction of the spindle magnetic unit.

11. The magnetic suspension bearing of claim 10, wherein the spindle magnetic unit is magnetized axially and the stator magnetic unit is magnetized axially in the same magnetized direction of the spindle magnetic unit.

12. The magnetic suspension bearing unit of claim 1, wherein the spindle is in contact with the loading section on a single point.

13. The magnetic suspension bearing of claim 1, wherein the loading section has a cavity to receive one end of the spindle.

14. The magnetic suspension bearing of claim 1, wherein the loading section has a substantially flat top side.

15. The magnetic suspension bearing of claim 1, wherein the loading section has a substantially concave arched side in contact with the spindle.

16. The magnetic suspension bearing of claim 1, wherein the loading section has a substantially convex arched side in contact with the spindle.

17. The magnetic suspension bearing of claim 1, wherein an end of the spindle corresponding to the loading section has a rounded angle for raising the friction appropriately between the spindle and the loading section.

* * * * *